United States Patent [19]
Hurst, Jr. et al.

[11] Patent Number: 4,654,714
[45] Date of Patent: Mar. 31, 1987

[54] PIXEL ADDRESSING SYSTEM

[75] Inventors: Robert N. Hurst, Jr., Mercer County; James M. Walter, Burlington County, both of N.J.

[73] Assignee: RCA Corporation, Princeton, N.J.

[21] Appl. No.: 792,894

[22] Filed: Oct. 30, 1985

[51] Int. Cl.[4] .............................................. H04N 5/21
[52] U.S. Cl. ..................................... 358/213; 358/167
[58] Field of Search ............... 358/213, 212, 167, 163, 358/166

[56] References Cited

U.S. PATENT DOCUMENTS

| 4,167,754 | 9/1979 | Nagumo et al. | 358/167 |
|---|---|---|---|
| 4,237,488 | 12/1980 | Takemura | 358/163 |
| 4,392,157 | 7/1983 | Garcia et al. | 358/167 |
| 4,481,539 | 11/1984 | Meise et al. | 358/213 |
| 4,523,231 | 6/1985 | Therrien | 358/213 |
| 4,524,390 | 6/1985 | Lemke | 358/213 |
| 4,590,520 | 5/1986 | Frame et al. | 358/213 |
| 4,600,946 | 7/1986 | Levine | 358/213 |

Primary Examiner—Gene Z. Rubinson
Assistant Examiner—Stephen Brinich
Attorney, Agent, or Firm—Paul J. Rasmussen; Lawrence C. Edelman; James B. Hayes

[57] ABSTRACT

Apparatus for identifying a plurality of given elements read out of an array of elements arranged in lines and columns is described. The apparatus includes a line-rate counter for developing addressing signals and a memory for providing data signals corresponding to the column location of the given elements in response to the addressing signals. A programmable counter counts columns in response to the data signals read out of the memory for providing a signal which corresponds in time to read out of respective ones of the plurality of given elements.

20 Claims, 4 Drawing Figures

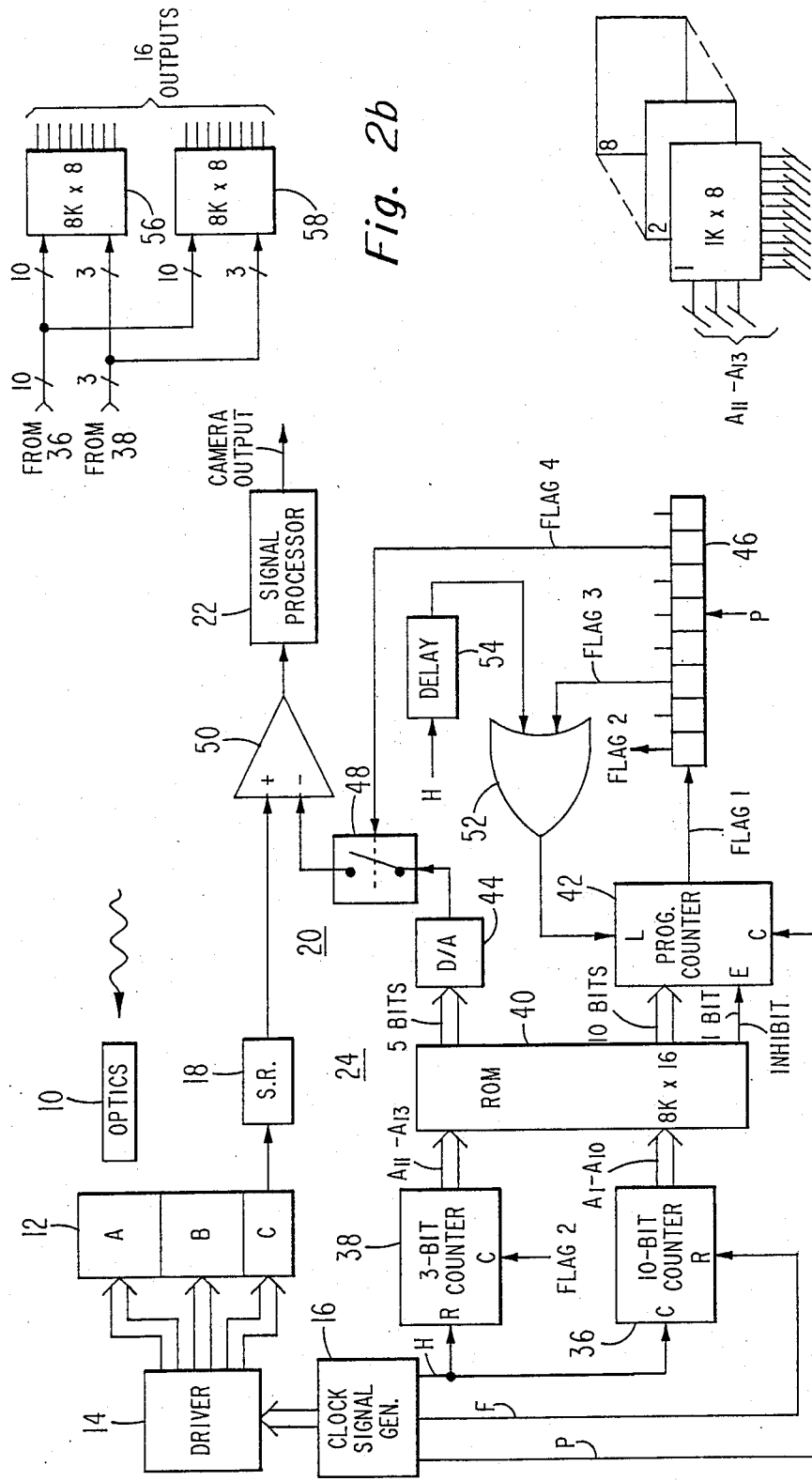
Fig. 2a
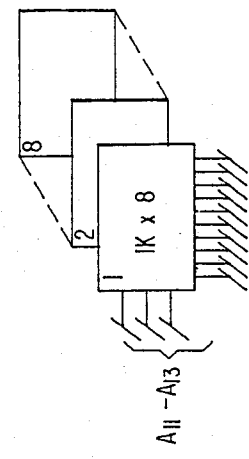
Fig. 2b
Fig. 2c

PIXEL ADDRESSING SYSTEM

FIELD OF THE INVENTION

The present invention relates generally to apparatus for identifying a given element in an array of elements and more specifically to addressing apparatus particularly useful in a defect corrector for a solid-state imager including defective picture elements.

BACKGROUND OF THE INVENTION

Solid-state imagers are finding increased use in cameras for detecting radiant energy in the visible and infrared light range due to their long life, low power consumption and small size, as compared with conventional image pick-up tubes. Solid-state imagers include an imaging area comprising an array of discrete photosensitive picture elements (pixels) for responding to light from a scene. Typically, solid-state imagers which are suitable for use in television cameras, such as the x-y addressed MOS field-effect transistor type or the self-scanned CTD (charge transfer device) type, have up to 200,000 pixels. Defects occur in solid-state imagers because of random non-uniformities in semiconductor substrate material from which the solid-state imagers are fabricated, and impurities and/or imperfections introduced during the manufacturing process. For example, one type of imaging response characteristic for a solid-state imager is dark current response. It is well known that semiconductor devices exhibit a certain amount of leakage current. In a solid-state imager, the leakage current may result in the collection of a charge in a pixel even in the absence of photo-excitation and is known as the dark current response. When solid-state imagers are used in television cameras, the dark current (nonimage-representative) response of each pixel must be relatively low as compared to its image-representative photoresponse so as to allow television signals to be generated with an acceptable signal-to-noise ratio. However, if the dark current response for a particular pixel is higher than the average level of its surrounding pixels, it will show up as a "white spot" defect in the generated television signal. Impurities and/or imperfections introduced during the manufacturing process of the imager can also cause a "black spot" defect in a television signal. Because of defects, the manufacturing yield of solid-state imagers having a large number of pixels, such as those suitable for high quality television cameras, may be quite low. Thus, each imager must be carefully tested to screen out those with defects and a high cost is associated with the relatively few imagers which are found to be acceptable.

One way of using imperfect imagers in a television camera, thereby increasing the number of usable imagers and consequently lowering their cost, is to include a defect corrector in the camera. For example, U.S. patent application Ser. No. 779,862 filed on Sept. 25, 1985 in the name of Peter Alan Levine and assigned, like the present application, to RCA Corporation, relates to a defect corrector for a solid-state imager camera which includes a memory for providing data signals representative of the location of defective imager pixels and an address generator which provides data signals representative of the location of the pixel currently being read out from the imager. When an address comparator detects a match between these two data signals, a flag signal is generated which indicates the current pixel being read out from the imager is defective and corrective action is taken. The address generator and comparator have to operate at high speed which may involve high power consumption.

Since solid-state imager cameras are ideally suited for portable, i.e., battery operation, it is desirable to provide a pixel addressing generator which minimizes power consumption and the number of circuit components.

SUMMARY OF THE INVENTION

In accordance with the principles of the present invention, apparatus for identifying a given element during the "reading out" of an array of elements arranged in a plurality of lines and columns, comprises a counter for providing address signals representative of the line in the array currently being read out and a memory having address inputs responsive to the address signals for providing data signals representative of the column of the given element within a particular line. A programmable counter is responsive to the data signals for counting columns along the particular line and providing an element identifying signal which occurs substantially at the same time the given element is being read out of the array.

In accordance with a further aspect of the invention, the identifying signal is used to modify the address signals supplied to the memory so as to cause new data signals to be supplied which are representative of a second given element which is located in the same line of the array as the first given element.

In accordance with a still further aspect of the invention, the memory provides, in addition to the first-mentioned data signals, additional data signals which are representative of the amplitude of a correction signal for a respective one of each of the given elements.

BRIEF DESCRIPTION OF THE DRAWING

FIGS. 2a, 2b and 2c illustrate, in block diagram form, a television camera including a video signal defect corrector constructed in accordance with the present invention.

DESCRIPTION OF THE PREFERRED EMBODIMENTS

Figure 1:
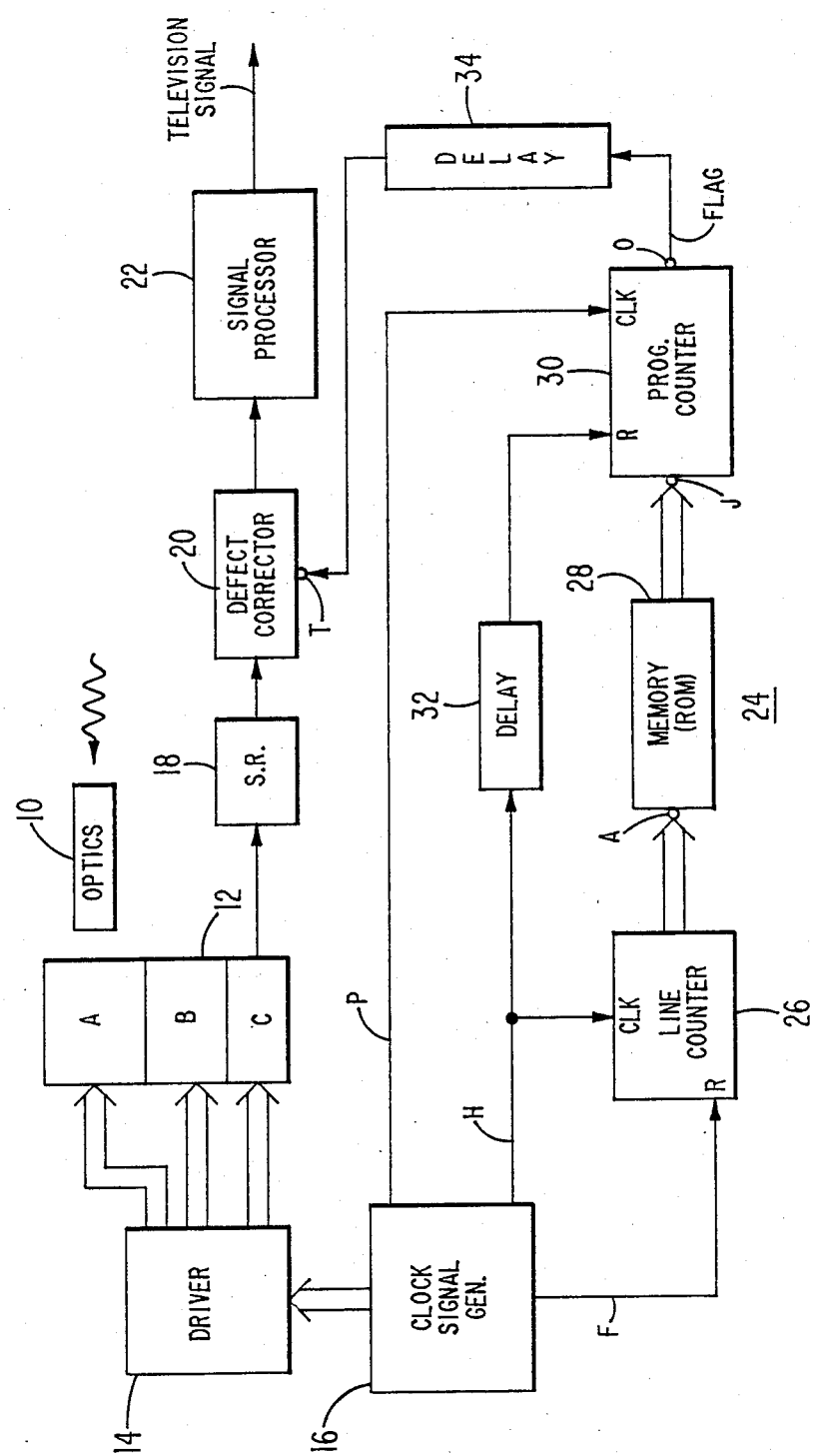
FIG. 1 illustrates, in block diagram form, a television camera including a video signal defect corrector which is activated by pixel addressing apparatus constructed in accordance with the invention.

In the television camera of FIG. 1, optics 10 directs light, illustrated by a wavy arrow, from a scene onto the photosensitive imaging area of a solid-state imager 12. While imager 12 may comprise any one of several commonly used solid-state imaging devices, such as an x-y addressed MOS imager or a self-scanned CTD (charge transfer device) imager, in the illustrated embodiment imager 12 comprises a frame transfer CCD (charge coupled device) imager, such as the SID504 frame transfer CCD imager currently available from RCA Corporation. Briefly, a frame transfer CCD imager comprises a semiconductor substrate including a plurality of electrodes disposed over a substrate insulating layer and selectively doped regions for forming an imaging area (A register) including an array of photosensitive picture elements (pixels) for developing a charge pattern in response to incident light from the scene, a charge transfer area (B register) masked from incident light for storing the charge pattern developed in the A register, and a readout area (C register) for reading out electrical signals corresponding to the developed charge pattern. A drive stage 14, including level shifting and amplifying stages as is well known, supplies level shifted and amplified versions of multiphase clock signals developed by a timing and synchronization (sync) clock signal generator 16 to the electrodes in the A, B and C registers of imager 12. The construction and operation of CCD imagers is well known to those skilled in the art, therefore, further detailed description of imager 12 is unnecessary.

The electrical signal produced at the output of the C register is applied to a signal recovery circuit 18, which may comprise, for example, a well known correlated double-sampling circuit. The output signal from signal recovery circuit 18 is applied to a defect corrector 20 wherein response from defective pixels of imager 12 are removed from the signal recovered by signal recovery circuit 18. The defect corrected recovered signal is then processed by a signal processor 22, which may include gamma correction, white and black balance and synchronization signal insertion, etc. for developing a conventional television output signal. Defect corrector 20 may be of the substitution type which substitutes response from a good pixel for response from a defective pixel and comprises, for example, a pixel-rate sample-and-hold circuit which is inhibited from sampling during the time the recovered signal corresponds to response from a defective pixel, such as in U.S. Pat. No. 4,167,754 filed in the name of Nagumo et al. Alternatively, defect corrector 20 may be of the subtraction type which generates a signal level representative of the amplitude of the defect response from a defective pixel and subtracts the generated defect signal level from the recovered signal during the time the recovered signal corresponds to response from the defective pixel. A subtraction type defect corrector is illustrated and described in greater detail with respect to FIGS. 2a, 2b and 2c.

Irrespective of the type of defect corrector used, it is necessary to provide to defect corrector 20 a FLAG signal to identify which portion of the recovered signal corresponds to a response from a defective pixel. A pixel address circuit 24 constructed in accordance with the present invention develops the FLAG signal which is timed to occur substantially synchronously with the application to defect corrector 20 of signal from recovery circuit 18 which corresponds to a response from the defective pixel.

Pixel addressing circuit 24 comprises a line-rate counter 26, a memory 28 and a programmable counter 30. A frame (F) pulse produced once per television frame by clock signal generator 16 is applied to the reset (R) input of line-counter 26 and a horizontal line (H) pulse produced once per television horizontal line by clock signal generator 16 is applied to the clock (CLK) input of line-counter 26. Thus, line-counter 26 provides at its output binary signals which identify which line of the array of pixels in the A register of imager 12 is currently being read out of imager 12. These binary signals are applied as address signals to the address inputs (A) of memory 28. Memory 28 comprises a read-only-memory (ROM) having stored therein data signals for each address signal. The data signals correspond to the column number in a given line of the array which has a defective pixel or a number greater than the total number of columns in the array if there are no defective pixels in that particular line of the array. The data signals are applied to the jam (J) inputs of programmable counter 30 and are loaded therein each line time in response to the first pixel-rate (P) pulse applied to its CLK input after an H pulse is applied to its reset (R) input. A delay 32 provides a time delay to the H pulse substantially corresponding to the time required for the new data signals to appear at the output of memory 28 after line-counter 26 has been incremented by the H pulse. Thereafter, counter 30 counts P pulses which are applied to its CLK input, beginning from a number corresponding to the loaded data signals. If the current line had a defect, counter 30 will count to zero during that line time. When a count of zero is reached, counter 30 provides at its output (O) a zero-detect output pulse having a duration corresponding in time to the width of a pixel as a FLAG signal. A delay 34 is provided between the output of counter 30 and the trigger (T) input of defect corrector 20 for precisely matching the time of application of the flag signal with the arrival of the recovered signal corresponding to readout of the defective pixel at the signal input of defect corrector 20. If there is no defective pixel in the current line, since the data signals loaded into programmable counter 30 corresponds to a number of columns greater than the number of pixels in the pixel array, counter 30 will not reach the zero count during that line time and the flag signal will not be generated.

During camera manufacture, memory 28 is loaded with data signals in response to analysis of the signals supplied by imager 12. For detecting the location of "white spot" defects, light is blocked from reaching imager 12, for example, by a lens cap, and the television signal supplied from the camera is reproduced on a monitor. Each defect will show up as a white spot in an otherwise dark picture. Manufacturing personnel operate line-counter 26 manually while viewing the monitor and load data signals into memory 28 corresponding to a number greater than the number of columns in the pixel array for each line of the array which has no defect. If a line has a defect, a movable cursor is aligned on the monitor with that defect to determine its column location. Then, data signals corresponding to that column location are loaded into memory 28 for that line. The same process can be used for loading data signals into memory 28 for "black spot defects", by exposing imager 12 to a uniformly lit field so that the defects will be visible on the monitor as black spots. Additionally, this process could be accomplished automatically using a microprocessor-controlled comparator for finding the location of the defects and loading the proper data signals into memory 28.

FIG. 2 illustrates an alternative embodiment of a pixel addressing apparatus for a television camera which takes into account correction of multiple defects per line and which simplifies the construction of a subtraction type defect corrector. In FIG. 2, an image-representative signal is developed by optics 10, imager 12, driver 14, clock signal generator 16, signal recovery circuit 18 and signal processor 22 in a manner similar to that shown and described with reference to FIG. 1. However, the line counter comprises a first counter 36 which counts in response to the H-rate signals and is reset in response to the F-rate signals for developing address signals $A_1$–$A_{10}$ representative of sequential lines in the pixel array of imager 12. A second counter 38 counts in response to a FLAG signal (i.e., FLAG 2) re-timed to be synchronous with the P signal and is reset by the H-rate signals for adding to address signals $A_1$–$A_{10}$ additional address signals $A_{11}$–$A_{13}$. Ten bits ($A_1$–$A_{10}$) are required to be supplied by counter 36 in order to be able to count the 525 lines of the previously noted type of imager such as the RCA S1D504 CCD imager and three bits ($A_{11}$–$A_{13}$) are required to be supplied by counter 38 in order to allow up to seven defects per line to be identified and corrected, as will now be more fully explained.

A ROM 40 is responsive to address signals $A_1$–$A_{13}$ for causing 16 parallel data signals to be supplied therefrom for each unique address it receives. A first group of the data signals, i.e., 10 bits are provided to the jam inputs of a programmable counter 42 which operates in response thereto in the same manner as programmable counter 30 of FIG. 1. If the data signals indicate a defect is located on the current line of the arrray, a FLAG 1 signal is developed at its output. If a defect is not located on the current line, a 1-bit inhibit signal is provided as the sixteenth data signal from ROM 40 for inhibiting the counting by programmable counter 42 during the current line. The inhibit signal is loaded into ROM 40 during camera manufacture in a manner similar to that described in conjunction with the loading of other data signals into the memory of FIG. 1. A second group of the data signals, i.e., 5 bits is representative of the amplitude of a defect correction signal for a corresponding defect on the line, if there is a defect on that particular line. The second group of data signals are also loaded into ROM 40 during camera manufacture. A digital-to-analog (D/A) converter 44 is responsive to the 5 bits of data signals for developing and holding at its output a defect signal level. If there is a defect in the line currently being read out of imager 12, the FLAG 1 signal is delayed via a shift register 46 and applied as a FLAG 4 signal to close a gate circuit 48 coupled to the output of D/A converter 44. Gate 48 couples the defect correction signal level to the inverting (−) input of a differential amplifier 50 which receives the recovered signal at its non-inverting (+). Shift register 46 is responsive to P-rate signals for appropriately delaying the FLAG signal so that the defect correction signals are applied to differential amplifier 50 concurrently with response from the correpsonding defective pixel. In the illustrated embodiment, the type of defect being corrected is nonimage-representative pixel response such as dark current. Therefore, the defect correction signals are representative of the dark current amplitude response for respective ones of the defective pixels, which correction signals are subtracted via differential amplifier 50 from the signal recovered from the defective pixels for supplying a defect corrected recovered signal to signal processor 22.

As previously noted, the FLAG 2 signal is applied to the CLK input of counter 38. In response thereto, counter 38 changes the $A_{11}$–$A_{13}$ address signals applied to ROM 40 and new data signals are provided at the output of ROM 40. A FLAG 3 signal is provided by shift register 46 to the load (L) input of programmable counter 42 via an OR gate 52. Shift register 46 causes the FLAG 3 signal to be applied to the L input after the new data signals from ROM 40 have stabilized. If the new data signals are representative of a second defect in the current line, the prior process is repeated. This process can be repeated up to 7 times for correcting up to 7 defects per line in the recovered signal. However, if there are no further defects in the line, the 1-bit inhibit signal is provided to the enable (E) input of counter 42 for inhibiting its operation and preventing the generation of the FLAG signals. When readout of the current line is complete, the next H pulse increments line counter 36 and after new data signals have become stabilized at the output of ROM 40, the H pulse, appropriately delayed by a delay 54, is applied via OR gate 52 to the L input of counter 42, beginning the process over again for the next line read out from imager 12.

In the illustrated embodiment, ROM 40 comprises 8K of 16-bit bytes. FIG. 2b illustrates an arrangement of two 8K×8-bit standard memory integrated circuits 56 and 58 arranged in parallel for being simultaneous addressed via counters 36 and 38.

FIG. 2c conceptually illustrates the addressing scheme of each of 8K×8-bit memories 56 and 58, wherein address lines A1–A10 can address up to 1000 lines of an array (although in the illustrated example, only 525 lines are required to be addressed) for each one of 8 pages of 1K memory. Each of memories 56 and 58 provide one of 8 unique 8-bit outputs for each unique address applied to its input. Each 8-bit outputs is representative of a given defective pixel in a line and is stored on a different page of the memory, as addressed via address lines $A_{11}$–$A_{13}$. It should be noted that with this arrangement, up to 7 defects per line can be corrected, the eighth page of ROM 40 storing data signals which prevent generation of any FLAG signals for the remainder of the line, i.e., a 1-bit inhibit signal for a number corresponding to a number of columns greater than in the pixel array of imager 12.

Although in the illustrated embodiments, the pixel addressing apparatus is used in conjunction with a frame-transfer CCD imager television camera, it should be clear that the principles of the invention apply equally well to pixel addressing apparatus for television cameras including other types of scanned array imagers as well as for addressing any type of array of elements arranged in lines and columns. Furthermore, it should be noted that in the described arrangement, it is possible to prevent the generation of the FLAG signal at the output of programmable counter 42 without requiring an additional 1-bit inhibit pulse. For example, the 10-bit data signals applied to programmable counter 42 can be representative of a number which is greater than the number of columns in the array of elements. Therefore, programmable counter 42 will not count down to zero within a one-line time and provide a FLAG 1 output signal. Consequently, the inhibit data line at the output of ROM 40 could be used for carrying an additional bit of data to D/A converter 44 (i.e., for a total of six bits to D/A converter 44) for increasing the resolution of the generated defect correction signal. These and other modifications are considered to be within the scope of the following claims.

What is claimed is:

1. Apparatus for identifying a given element in a scanned array of elements arranged in a pluarlity of lines and columns, comprising:

clock means for providing clock signals to said array for causing scanning of said elements;

line counting means responsive to said clock means for providing address signals representative of respective ones of said lines of said array as it is being scanned;

memory means responsive to said address signals for providing data signals representative of only column location information of said given element located in the line represented by said address signals; and programmable counting means coupled to said clock means and responsive to said data signals for counting a number of columns in only the line of said array corresponding to the then address signal input of said memory means and generating an element identifying signal substantially concurrently with the scanning of said given element in said array.

2. Apparatus according to claim 1, further including:
means coupled to said line counting means for resetting said line counting means after all lines of said array have been scanned.

3. Apparatus according to claim 2, further including:
means for resetting said programmable counting means after all lines of said array have been scanned.

4. Apparatus for identifying a given element in a scanned array of elements arranged in a plurality of lines and columns, comprising:
clock means for providing clock signals to said array for causing scanning of said elements;
line couting means responsive to said clock means for providing address signals representative of respective ones of said lines of said array as it is being scanned;
memory means responsive to said address signals for providing data signals representative of the column containing said given element when said element is located in the line represented by said address signals;
programmable counting means coupled to said clock means and responsive to said data signals for counting a number of columns of said array corresponding to said data signals and generating an element identifying signal substantially concurrently with the scanning of said given element in said array; and
said memory means provides data signals representative of a further column of said array which contains a further given element.

5. Apparatus according to claim 4, further including:
additional counter means for generating additional address signals which are applied to said memory means, the contents of said additional counter means being changed in response to said element identifying signal which is generated in response to the identification of the first-mentioned given element.

6. Apparatus for identifying when each of a plurality of given elements are read out during the read out of an array of elements arranged in a plurality of lines and columns, comprising:
clock means for providing clock signals to said array for causing line-by-line read out of said array;
line counter means responsive to said clock means for providing address signals representative of respective ones of said lines of said array concurrently with the line-by-line read out of said array;
memory means responsive to said address signals for providing a first type of data signals which are sequentially representative of the column containing respective ones of said plurality of given elements, if any of said plurality of given elements occur in the line of said array currently being read out, and providing a second type of data signals comprising at least one data signal if none of said plurality of given elements occur in the line currently being read out of said array; and
programmable counter means coupled to said clock means and responsive to said first type of data signals for counting a number of columns of said array and generating an identifying signal at its output corresponding to the read out of a first one of said given elements in a line of said array and responsive to said second type of data signals for preventing the generation of said identification signal during read out of said line of said array, said identifying signal being coupled to said line counter means for changing said address signals applied to said memory means during the read out of said line of said array containing said first given element.

7. Apparatus according to claim 6, wherein said line counter means comprises:
a first counter which counts in response to a line-rate signal corresponding to the read out of each line of said array and is reset in response to a frame-rate signal corresponding to the completion of the read out of all lines of said array; and
a second counter which counts in response to said identifying signal and is reset in response to said line-rate signal.

8. Apparatus according to claim 7, wherein:
said programmable counter includes jam inputs for receiving said data signals, includes a zero-defect output for generating said identifying signals and a load input responsive to successive ones of said identifying signals and said line-rate signal for loading said data signals into said programmable counter.

9. Apparatus according to claim 8, wherein:
said programmable counter is of the down-counter type.

10. Apparatus according to claim 6, wherein:
in response to said changed address signal, said memory means provides data signals of said first type representative of the column containing a second one of said plurality of given elements if a second given element occurs in said line, and if not, provides data signals of said second type.

11. Apparatus according to claim 10, wherein:
said programmable counter means generates a further identifying signal corresponding to read out of said second given element in said line if said data signals are of said first type and is prevented from generating a further identifying signal while the remainder of said line is being read out of said array if said data signals are of said second type.

12. Apparatus according to claim 6, wherein:
said memory means provides said first and second types of data signals as a first group of outputs and provides a third type of data signals as a second group of outputs, said third type of data signals corresponding to amplitude information for each of respective ones of said plurality of given elements.

13. Apparatus according to claim 12, further including:
element defect correction apparatus responsive to said third type of data signals for developing element correction signals and a selective combining means responsive to said identifying signals and said element correction signals for selectively combining said element correction signals with signal read out of said array which corresponds to said given elements.

14. Apparatus for removing nonimage-representative response from the signal read out of a solid-state image including an array of photosensitive elements arranged in a plurality of lines and columns and including a plurality of given elements which provide nonimage-representative response as well as image-representative response, comprising:

clock means for providing clock signals to said array for causing line-by-line readout of said array;

line counter means responsive to said clock means for providing address signals representative of respective ones of said lines of said array concurrently with the line-by-line read out of said array;

memory means responsive to said address signals for providing a first group of data signals including data signals of a first type which are sequentially representative of only column location information of the column containing respective ones of said plurality of given elements, if any of said plurality of given elements occur in the respective line of said array concurrently being read out, and providing a second group of data signals corresponding to the amplitude of said nonimage-representative response for each of respective ones of said plurality of given elements;

programmable counter means coupled to said clock means and responsive to said first group of data signals for counting a number of columns in only the one of the lines of said array corresponding to the then address signal input of said memory means and generating an identifying signal at its output corresponding to the readout of a first one of said given elements in that line of said array;

means for developing an element correction signal in response to said second group of data signals; and means responsive to said identifying signal and said element correction signal for selectively summing said element correction signal with said image signal so as to substantially remove said nonimage-representative response from said imager signal.

15. Apparatus for removing nonimager-representative response from the signal read out of a solid-state imager including an array of photosensitive elements arranged in a plurality of lines and columns and including a plurality of given elements which provide nonimager-representative response as well as image-representative response, comprising:

clock means for providing clock signals to said array for causing line-by-line readout of said array;

line counter means responsive to said clock means for providing address signals representative of respective ones of said lines of said array concurrently with the line-by-line read out of said array;

memory means responsive to said address signals for providing a first group of data signals including data signals of a first type which are sequentially representative of the column containing respective ones of said plurality of given elements, if any of said plurality of given elements occur in the respective line of said array currently being read out, and providing a second group of data signals corresponding to the amplitude of said nonimage-representative response for each of respective ones of said plurality of given elements;

programmable counter means coupled to said clock means and responsive to said first group of data signals for counting a number of columns of said array and generating an identifying signal at its output corresponding to the readout of a first one of said given element in a respective line of said array;

means for developing an element correction signal in response to said second group of data signals;

means responsive to said identifying signal and said element correction signal for selectively summing said element correction signal with said image signal so as to substantially remove said nonimage-representative response from said imager signal; and said identification signal is also coupled to said line counter means for changing said address signals applied to said memory means during the readout of said line of said array containing said first given element.

16. Apparatus according to claim 15, wherein said line counter means comprises:

a first counter which counts in response to a line-rate signal corresponding to the read out of each line of said array and is reset in response to a frame-rate signal corresponding to the completion of the read out of all lines of said array; and a second counter which counts in response to said identifying signal and is reset in response to said line-rate signal.

17. Apparatus according to claim 16, wherein:

said programmable counter includes jam inputs for receiving said data signals includes a zero-defect output for generating said identifying signals and a load input responsive to successive ones of said identifying signals and said line-rate signal for loading said data signals into said programmable counter.

18. Apparatus according to claim 15, wherein:

said first group of data signals provided by said memory means includes data signals of a second type comprising at least one data signal if none of said plurality of given defects occur at the line currently being read out of said array; and said programmable counter means is responsive to said second type of data signals for preventing the generation of said identification signal during readout of that corresponding line of said array.

19. Apparatus according to claim 18, wherein:

in response to said changed address signals, said memory means provides data signals of said first type representative of the column containing a second one of said plurality of given elements if a second given element occurs in said line, and if not, provides data signals of said second type.

20. Apparatus for identifying when a defective element is read out during the read out of an array of elements arranged in a plurality of lines and columns, comprising:

clock means for providing clock signals to said array for causing line-by-line read out of said array;

line counter means responsive to said clock means for providing address signals representative of respective ones of said lines of said array concurrently with the line-by-line read out of said array;

memory means responsive to said address signals for providing a first type of data signal which is representative of the column containing a defective element, if any defective elements occur in the line of said array currently being read out, and providing a second type of data signal if no defective element occurs in the line currently being read out of said array; and programmable counter means coupled to said clock means and responsive to said first type of data signal for counting a number of columns of said array and generating an identifying signal at its output corresponding to the read out of a defective element in a line of said array and responsive to said second type of data signal for preventing the generation of said identification signal during read out of said line of said array.

* * * * *